United States Patent [19]

Kashimura

[11] Patent Number: 4,473,194
[45] Date of Patent: Sep. 25, 1984

[54] TAPE REEL

[75] Inventor: Noritake Kashimura, Oomiya, Japan

[73] Assignee: Dai-Ichi Seiko Co., Ltd., Kawaguchi, Japan

[21] Appl. No.: 472,602

[22] Filed: Mar. 7, 1983

[30] Foreign Application Priority Data

Aug. 3, 1981 [JP] Japan .............................. 56-115552
Jan. 11, 1982 [JP] Japan .................................. 57-1950

[51] Int. Cl.³ ........................................ B65H 75/18
[52] U.S. Cl. ................................................ 242/71.8
[58] Field of Search .................. 242/71.8, 77.3, 118.6, 242/118.3, 118

[56] References Cited

U.S. PATENT DOCUMENTS 4,226,381 10/1980 Katata ................................ 242/71.8
4,289,282 9/1981 Kohno ................................ 242/71.8

FOREIGN PATENT DOCUMENTS 1144588 2/1963 Fed. Rep. of Germany ..... 242/71.8
2223294 10/1974 France .............................. 242/71.8

Primary Examiner—Stanley N. Gilreath
Attorney, Agent, or Firm—Cushman, Darby & Cushman

[57] ABSTRACT

A tape reel comprising a first flange having a hub formed with a plurality of coupling pawls on the top face and a second flange integrally coupled with the hub by fitting the coupling pawls respectively into a plurality of openings formed thereon. The respective pawls are so arranged on the bridge-shaped portions formed on the top of the hub that the hook portions are directed to the center of the hub in order to ensure the coupling between the hub and second flange and the edge portions of respective openings to be engaged with the hook portions are depressed to a depth so as to be able to correspond to the thickness of the second flange and the coupling pawls are so formed that the engaging faces of respective hook portions are on the same level as of the top face of the hub.

3 Claims, 5 Drawing Figures

TAPE REEL

BACKGROUND OF THE INVENTION (a) Field of the Invention:

The present invention relates to a tape reel and, more particularly to an improvement of tape reels, made of synthetic resins, to be assembled in a video tape cassette.

(b) Description of the Prior Art:

FIG. 1 is showing an example of this kind of conventional tape reel. This tape reel comprises a first flange 1 which is flat, a hub 2 formed integrally with the first flange and a second flange so coupled with the hub 2 by an after-mentioned manner as to be parallel to the first flange 1. On the top of the hub 2 are stood a plurality of coupling pawls 4 arranged with equal intervals and the hook portions 4a of the respective coupling pawls are directed radially to the outer side. The base of respective coupling pawls is so formed that the coupling pawls 4 are flexible in some degree to the radial direction and the head is so formed as to have a slant 4b. The openings 5 into which respective coupling pawls 4 will be fitted are formed on the second flange 3 and, when the second flange is forcibly pressed down against the hub 2 after aligning respective openings 5 to respective coupling pawls 4, the engaging edge portions 5a of the openings 5 are snap fitted into the hook portions 4a of the pawls 4 and the hub 2 and second flange 3 will be coupled integrally thereby. That is, at the first stage of the coupling between the openings and pawls, the coupling pawls 4 are bent to the centering direction of the hub through the engagement between the engaging edge portions 5a and slants 4b, but, when the engaging edge portions 5a correspond with the engaging faces 4a' of the hook portions 4a, the pawls 4 will return and the coupling between the hub and second flange will be completed. The space between the engaging faces 4a' of the hook portions and the top face of the hub corresponds to the thickness of the second flange 3.

The tape reel of this type of formation has such an advantage as to be simple in assemblage, but it has such a defect that, when the second flange 3 is pressed upwardly by an external force, the coupling pawls 4 are easily bent to the centering direction of the hub 2 and, consequently, the second flange comes out of the hub and the coupling between the second flange and hub will be imperfect because of the breakage of coupling pawls. Further, in order to mold the coupling pawls 4 having such a shape as mentioned above, it is necessary, as shown in FIG. 2, to use molds 6 and 7 and, consequently, the molded first flange hub is provided with a face S to slide each other when the molded first flange having the hub is taken away from the metallic mold. The existance of this kind of sliding face S results in producing a flash in moldings and also in complicating the formation of metallic mold, and, therefore, results in such a defect as to increase the cost of manufactures. Moreover, as the heads of the coupling pawls 4 protrude over the surface of the second flange when the second flange is coupled with the hub, this is not only disadvantageous for the handling of the tape reel but also so defective as the coupling between the second flange and hub is easily disengaged by the shock caused when the heads touch with other members.

SUMMARY OF THE INVENTION

The primary object of the present invention is, in order to ensure the solid coupling between the hub and second flange and to prevent the discoupling of the second flange from the hub even when the upward force acts on the second flange, to provide a tape reel so formed that a plurality of coupling pawls are arranged respectively on a plurality of bridge-shaped portions formed on the top of the hub and the hook portions thereof are all so formed as to be directed to the center of the hub.

Another object of the present invention is, in order to maintain the processing accuracy high and to enable to manufacture it at low cost, to provide a tape reel wherein the edge portions of respective openings to be engaged with the hook portions are recessed in accordance with the thickness of the second flange and respective coupling pawls are so formed that the engaging faces of respective hook portions are on the same level as of the top face of the hub.

DESCRIPTION OF THE PREFERRED EMBODIMENT

Figure 1:
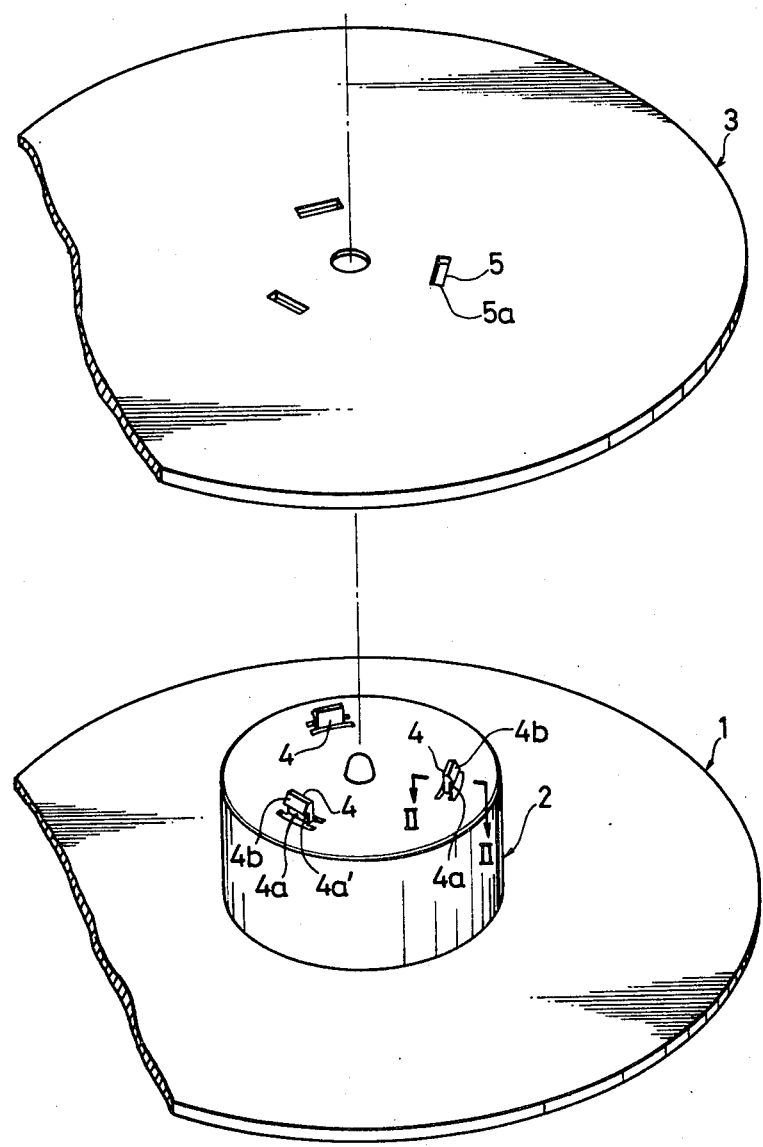
FIG. 1 is an exploded perspective view of a conventional tape reel.
Figure 2:
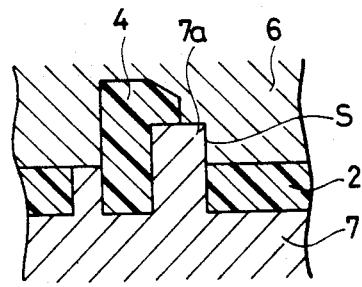
FIG. 2 is an enlarged and partially sectioned view showing the formation of a metallic mold to mold the coupling pawl portions of a conventional tape reel.
Figure 3:
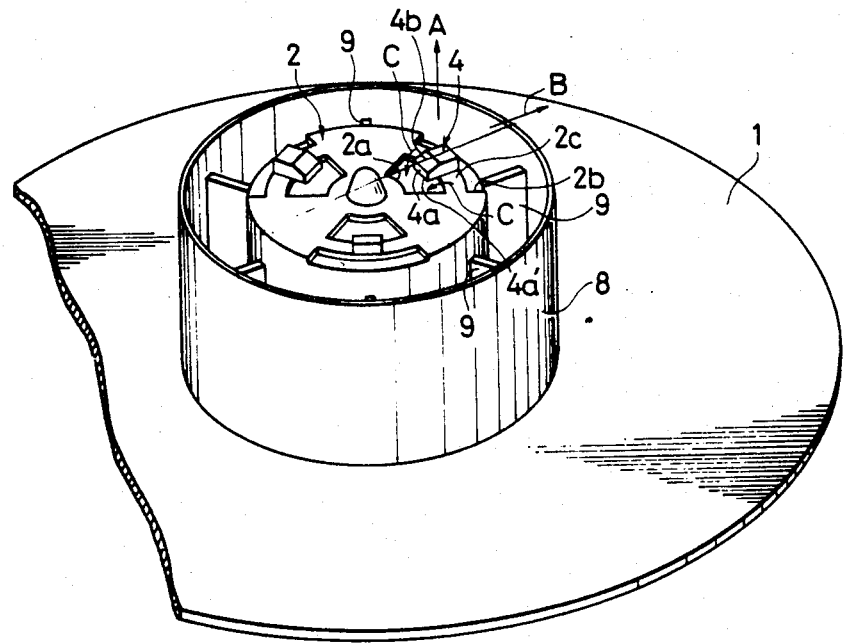
FIG. 3 is a partially broken perspective view of an embodiment shown without the second flange of a tape reel according to the present invention.
Figure 4:
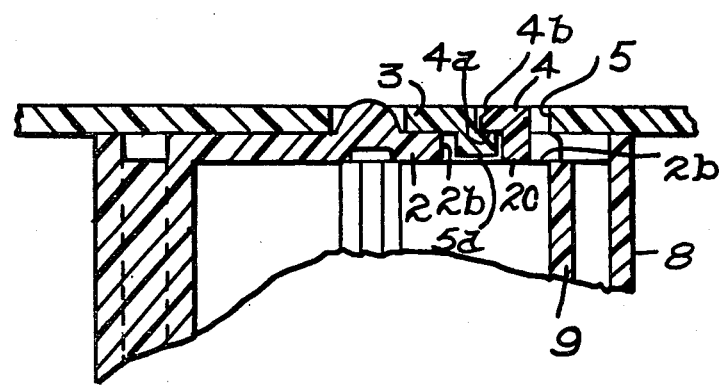
FIG. 4 is an enlarged and partially sectioned view showing the coupling formation between the second flange and hub in the tape reel according to the present invention.
Figure 5:
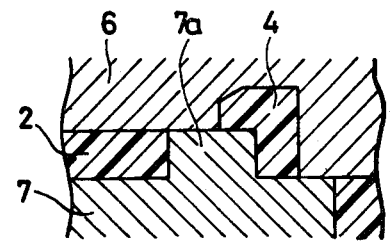
FIG. 5 is an enlarged and partially sectioned view showing the formation of the metallic mold to mold the coupling pawl portions in the tape reel according to the present invention.

Referring to FIGS. 3 through 5, same numerals are given to the parts or portions same or similar to those shown in FIGS. 1 and 2. On the top wall of the hub 2, as clearly shown in FIG. 3, arched bridge-shaped portions 2c formed with V-shaped openings 2a and arched cut-off portions 2b are arranged on the bridge-shaped portions 2c are stood the coupling pawls 4. On the top of the hub 2, preferably three groups of the bridge-shaped portion 2c and coupling pawl 4 are arranged with equal intervals. It should be noted that the coupling pawls 4 are so arranged that the hook portions 4a thereof are directed to the center of the hub 2, that the bridge-shaped portions 2c have an appropriate flexibility and that the engaging faces 4a' of the hook portions 4a are on the same level as of the top face of the hub 2. On an outer side of the hub 2, a winding drum 8 concentric thereto is formed integrally with the first flange 1. The hub 2 and the winding drum 8 are joined together by a plurality of reinforcing ribs 9 extended in the radial direction between them. As shown clearly in FIG. 4, the engaging edge portions 5a of the openings 5 formed on the second flange 3 are depressed from the surface of the second flange 3 by the size corresponding to the thickness of the second flange 3. The area of this depression 5a corresponds to the area of the V-shaped opening 2a of the hub 2 and the engaging edge portions 5a are within the V-shaped openings 2a when the engaging edge portions 5a are engaged with the engaging faces 4a' of hook portions 4a of the coupling pawls 4 (FIG.

4). The height of heads of the coupling pawls 4 or the size from the engaging face 4a' of the hook 4a to the top face coincides with the thickness of the second flange 3. Therefore, the heads of the coupling pawls 4 are inside the opening 5 without protruding out of the surface of the second flange 3 when the hub and second flange are coupled together.

The coupling between the hub 2 and the second flange 3 is able to be effected by forcibly pushing the center area of the second flange 3 against the hub 2 after aligning respective openings 5 to respective coupling pawls 4. That is, at the first stage of coupling, the coupling pawls 4 bend radially to the outer side or to the arrow direction B in FIG. 3 through the engagement between the engaging edge portions 5a and slants 4b, but the coupling pawls 4 return to the original state when the engaging edge portions 5a coincide with the engaging faces 4a' of the hook portions 4a and the coupling between the hub 2 and second flange 3 will be completed. When the second flange 3 is coupled with the hub 2 in this way, the tape reel can be handled conveniently because the heads of the coupling pawls 4 do not protrude out of the surface of the second flange 3. Further, when an upward external force or an external force to the direction shown by the arrow A is added on the second flange 3 as shown in FIG. 3, the coupling pawls 4 tend to bend radially to the outer side or in the direction shown by the arrow B and at the same time they tend to twist the bridge-shaped portions 2c in the direction shown by the arrow B. This twisting force acting on the bridge-shaped portions 2c produces a reacting force to the direction shown by the arrow C in the bridge-shaped portions 2c and this reacting force makes the coupling pawls 4 so displaced as to still further eat into the engaging edge portions 5a of the second flange 3. Therefore, when once the second flange is coupled with the hub, the coupling between them will never come off. Moreover, because, as mentioned above, the engaging faces 4a' of hook portions 4a of the coupling pawls 4 are at the same level as of the top face of the hub 2, the metallic mold used to mold the first flange 1 simultaneously with the hub is able to have such a formation wherein a sliding face need not be arranged between the molds 6 and 7 as shown in FIG. 5, and, consequently, the manufactures are without flash, the processing accuracy of manufactures is promoted thereby and the manufacturing costs of manufactures come down because the formation of metallic mold is able to be simplified. The top edge of the winding drum 8 is used as means to maintain the parallelism between the first and second flanges.

I claim:

1. A tape reel including a hub having a first end and a second end, a first flange made of synthetic resins and integrally molded on said first end of said hub, said hub being hollow adjacent at least said second end, said second end having a wall thereacross and having a plurality of coupling pawls thereon; a second flange made of synthetic resins and having a plurality of engagement openings provided with engaging edge portions to be respectively engaged with said coupling pawls, said coupling pawls being formed respectively on thin bridge-shaped portions formed respectively between V-shaped openings and arched cut-off portions both located in said wall on said second end of said hub, said coupling pawls having hooked portions directed to the center of said hub, whereby, with said bridge-shaped portions arranged on the outer edge of said V-shaped openings, said coupling pawls will be respectively displaced to further strongly engage with said engaging edge portions when an external force is added to disengage said second flange from said hub after said second flange has been engaged with said hub.

2. A tape reel according to claim 1, wherein said tape reel further comprises a winding drum molded integrally with said first flange outside of said hub and cocentrically with said hub and a plurality of reinforcing ribs connected between said hub and winding drum and extending radially.

3. A tape reel according to claim 1, wherein the edge portions of said engagement openings to be engaged with said hook portions of said coupling pawls are depressed to a depth so as to correspond to the thickness of said second flange and the engaging faces of said hook portions are located at the same level as of said hub.

* * * * *